United States Patent [19]

Licata et al.

[11] Patent Number: 4,476,416

[45] Date of Patent: Oct. 9, 1984

[54] POWER WINDOW CONTROL FOR MOTOR VEHICLE WINDOW

[75] Inventors: Joseph P. Licata, Dayton; Richard N. Lehnhoff; Frank J. Terkoski, both of Kettering, all of Ohio

[73] Assignee: General Motors Corporation, Detroit, Mich.

[21] Appl. No.: 490,314

[22] Filed: May 2, 1983

[51] Int. Cl.³ .............................................. H02P 1/22

[52] U.S. Cl. .................................... 318/283; 318/256; 318/286; 318/293

[58] Field of Search ............... 318/256, 283, 286, 291, 318/293

[56] References Cited

U.S. PATENT DOCUMENTS

| | | | |
|---|---|---|---|
| 4,001,661 | 1/1977 | Terabayashi | 318/264 |
| 4,338,552 | 7/1982 | Pilz et al. | 318/286 X |
| 4,347,465 | 8/1982 | Goertler et al. | 318/286 X |
| 4,373,149 | 2/1983 | Coste | 318/256 X |
| 4,379,985 | 4/1983 | Coppola | 318/256 X |
| 4,394,605 | 7/1983 | Terazawa | 318/256 X |

FOREIGN PATENT DOCUMENTS

| | | | |
|---|---|---|---|
| 2820330 | 11/1979 | Fed. Rep. of Germany | 318/283 |
| 563581 | 1/1981 | Japan | 318/283 |

*Primary Examiner*—J. V. Truhe
*Assistant Examiner*—Bentsu Ro
*Attorney, Agent, or Firm*—Robert M. Sigler

[57] ABSTRACT

Power window control apparatus for a motor vehicle window includes a motor actuatable to drive the window toward a predetermined position, an operator controlled actuator effective only during actuation to actuate the motor, a further actuator effective upon actuation of the operator controlled actuator for a time intermediate first and second predetermined time periods to maintain actuation of the motor after deactivation of the operator controlled actuator and an automatic deactivator effective to stop the motor and deactivate the further actuator when the window reaches the predetermined position. The window thus moves under operator control for very short or long movements but can be set to move under automatic control by actuation of the single operator control for a specified intermediate time duration. The further actuator may be a capacitor charged during the actuation of the operator controlled actuator for the first predetermined time to a voltage sufficient to maintain a motor driving FET conducting and a latching switch across the capacitor effective to discharge the same when the voltage thereacross reaches a higher voltage in the second predetermined time period.

4 Claims, 1 Drawing Figure

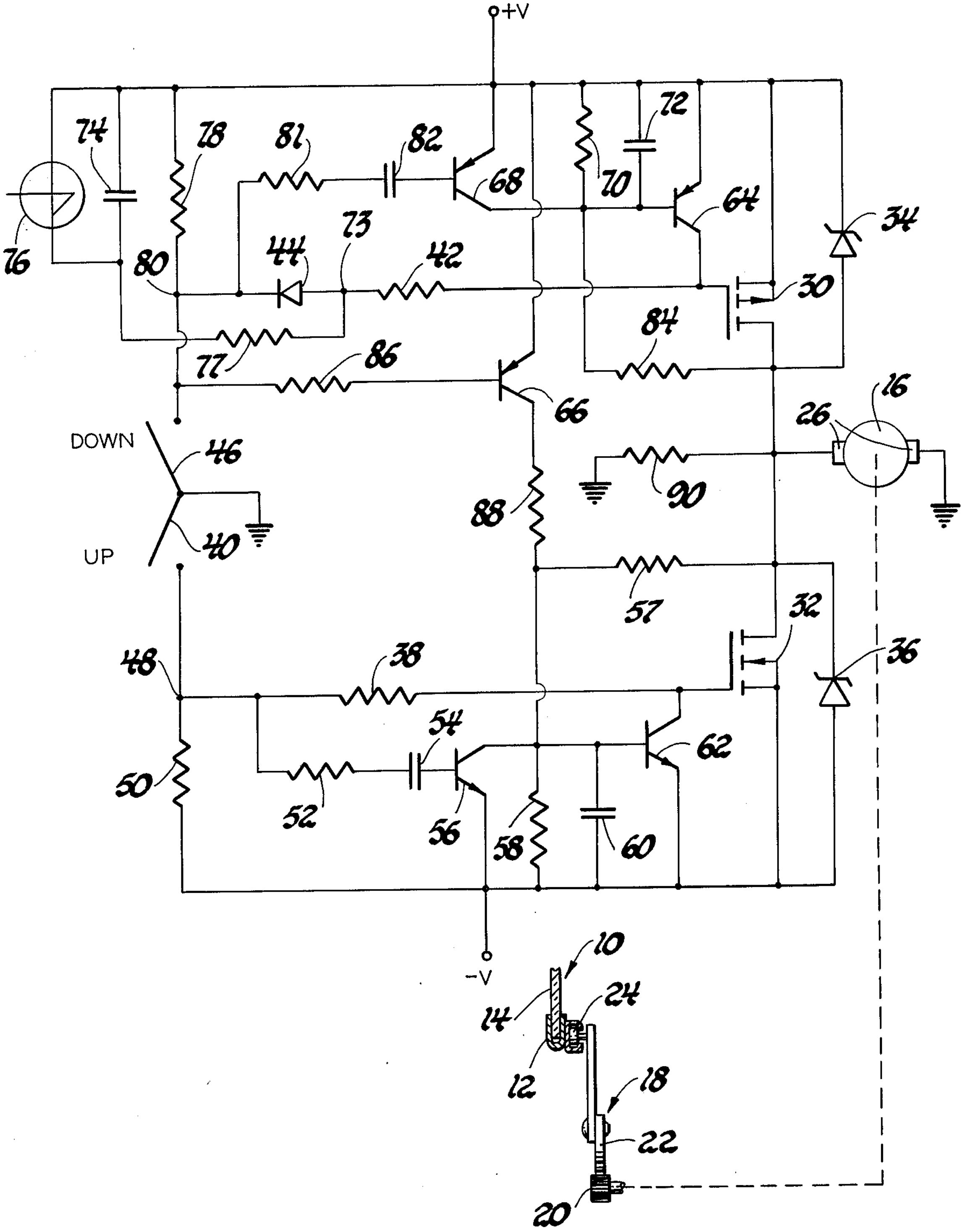
+V
74
78
81
82
68
72
70
64
34
76
80
44
73
42
30
84
77
86
66
26
16
DOWN
46
90
88
UP
40
57
32
48
38
36
54
62
50
52
56
58
60
-V
10
14
24
12
18
22
20

POWER WINDOW CONTROL FOR MOTOR VEHICLE WINDOW

BACKGROUND OF THE INVENTION

This invention relates to power controls for power actuated motor vehicle windows and particularly to such controls having at least one mode of operation in which a single touch of a switch initiates a window movement which continues after release of the switch and stops automatically under predetermined conditions. Such systems allow an operator to at least lower a vehicle window with a single touch of an actuator button without the necessity of continually holding the button until the window is completely lowered. However, there are times when an operator wishes to actuate a vehicle power window to move a lesser distance; and such capability should be provided. In addition, the actuator device should be easy for the operator to use so that it does not distract his attention from the driving of the vehicle. Therefore a single switch arrangement is desirable.

SUMMARY OF THE INVENTION

It is therefore an object of this invention to provide a power control for a powered vehicle window which provides both operator controlled and one touch automatic power window movement with a single actuator switch. The control apparatus comprises electric motor means effective to drive the window toward a predetermined position, operator controlled actuator means effective to actuate the electric motor while actuated, further actuation means effective to maintain continuing actuation of the electric motor means after deactivation of the operator controlled actuation means only if the duration of actuation of the operator controlled actuation means is intermediate first and second predetermined time periods and automatic deactivation means effective when the window reaches the predetermined position to deactivate the electric motor means. The power window control apparatus can thus be momentarily actuated to move the window a very small distance with a short touch of the actuator button, placed in an automatic power mode with a touch of intermediate duration or moved under operator control for a longer distance if the switch is actuated for a longer time. Further details and advantages of this invention will be apparent from the accompanying drawings and the following description of a preferred embodiment.

DESCRIPTION OF THE PREFERRED EMBODIMENT

The single FIGURE shows a preferred embodiment for the power window control apparatus of this invention. A window 10, which is portrayed as a vehicle window that includes a window frame 12 and a window pane 14, is opened and closed by a bi-directional DC motor 16 which drives a drive mechanism 18. While drive mechanism 18 may be of any suitable type known to those skilled in the art, it is presented in the drawing for purposes of illustration as including a gear 20 driven by motor 16 and a rack 22 driven by gear 20 and connected to window frame 12 through coupling 24. The rotation of motor 16 in either direction rotates the gear 20 to translate rack 22 in one of two opposite directions and thereby raise or lower window 10.

Motor 16 is shown in this embodiment as being of the permanent magnet type having an armature circuit with a pair of brushes 26, one of which is connected to ground and the other, alternatively, to sources of electric power at voltages +V and −V through p-channel and n-channel enhancement MOSFETS 30 and 32, respectively. Each of the MOSFETS 30 and 32 is capable of handling sufficient power to drive motor 16 and has its drain connected to the brush 26 at motor 16 and its source connected to its respective source of electrical power. Zener diodes 34 and 36 are connected across MOSFETS 30 and 32, respectively, for over voltage protection.

The gate of MOSFET 32 is connected through a resistor 38 and switch 40 to ground. The gate of MOSFET 30 is connected through a resistor 42, diode 44 and switch 46 to ground. Switch 40 will be called the "up" switch, since closure of the switch by the operator provides voltage from the electric power source to actuate MOSFET 32 to power motor 16 and drive window 10 in the upward direction; whereas switch 46 will be called the "down" switch, since closure of the switch by the operator provides voltage from the electric power source to actuate MOSFET 30 to power motor 16 to drive window 10 in the opposite or downward direction.

The junction 48 of resistor 38 and switch 40 is connected through a resistor 50 to the source of electrical power at voltage −V and also through a resistor 52 and capacitor 54 to the base of an NPN bipolar transistor 56 having an emitter connected to the source of electrical power at voltage −V. The collector of transistor 56 is connected through a parallel resistor 58 and capacitor 60 to the source of electrical power at voltage −V and also to the base of an NPN bipolar transistor 62 having an emitter connected to the source of electrical power at voltage −V and a collector connected to the gate of MOSFET 32.

The circuit described to this point controls the upward actuation of window 10. This portion of the circuitry does not operate in accordance with the complete invention; however, it is essentially duplicated as a part of the circuitry which does comprise an embodiment of the complete invention. Therefore, its operation will be described at this point as background for the later description of circuitry completing the invention.

Closure of switch 40 connects ground potential through resistor 38 to the gate of MOSFET 32, the source of which is at a voltage lower than ground potential. MOSFET 32 thus begins conducting and provides armature current through motor 16 in a direction to cause motor 16 to begin rotation and drive window 10 in the upward direction. At the same time, current flows from ground through switch 40, resistor 52, capacitor 54 and the base-emitter junction of transistor 56 to the source of electrical power at voltage −V. This turns on transistor 56 for a brief time while capacitor 54 charges; and, during this brief time, the voltage on the base of transistor 62 is held low to prevent the turn-on of transistor 62. The significance of this will be described above. When window 10 encounters an obstruction, such as the upper window frame upon full closure or an impediment in its path, the armature current of motor 16 begins to rise. Since this armature current flows through the MOSFET 32 and the resistance of a MOSFET varies substantially directly with the current therethrough, the voltage across MOSFET 32 rises. A fixed percentage of the voltage across MOSFET 32 is applied to the base of transistor 62 through a resistor 57 connected from said base to the drain of MOSFET 32 and forming a voltage divider with resistor 58. Assuming transistor 56 is now turned off, this causes an increased current through transistor 62 which tends to bleed off the charge from the gate of MOSFET 32 and decrease the current therethrough. The current through motor 16 is thus limited sufficiently to stop motor 16, although it will continue to flow to some degree until the operator releases up button 40. Transistor 56 is thus seen to be useful in preventing this current limitation during the initial actuation of motor 16 when it is not desired but might occur due to the high initial starting current of the motor.

Continuing with the description of the embodiment shown in the figure, the source of electrical energy at voltage +V is connected to the emitters of bipolar PNP transistors 64, 66 and 68, to the base of transistor 64 through parallel resistor 70 and capacitor 72 and to the junction 73 of resistor 42 and diode 44 through a parallel capacitor 74 and silicon unilateral switch 76 in series with resistor 77. It is further connected to switch 46 through a resistor 78. Junction 80 of resistor 78 and switch 46 is connected through a resistor 81 and capacitor 82 to the base of transistor 68. The collector of transistor 68 is connected to the base of transistor 64 and, further, through a resistor 84 to the drain of MOSFET 30. The base of transistor 66 is connected to switch 46 through a resistor 86; and the collector of transistor 66 is connected through a resistor 88 to the base of transistor 62. Finally, the drains of MOSFETS 30 and 32 are connected through a resistor 90 to ground.

If the down switch 46 is actuated, ground potential is applied through diode 44 and resistor 42 to the gate of MOSFET 30 to allow conduction of current through MOSFET 30 and motor 16 in a direction to immediately initiate the lowering of window 10. Transistor 68 is immediately turned on to prevent the turn-on of limiting transistor 64 by the initial inrush of current through the armature of motor 16 in a manner similar to that of transistor 56 as described earlier in the specification. If the switch 46 is released and opened a very short time after its closure, the window 10 will have moved only a short distance downward and will stop moving.

Upon the initial closure of switch 46, capacitor or electric charge storage means 74 begins to charge through diode 44 and resistor 77, which comprises a resistive charging path for capacitor 74 from the electric power supply means having an RC time constant. After a first predetermined time, assuming that switch 46 has not been opened, the voltage across capacitor 74 will reach a first predetermined voltage sufficient that, if down switch 46 is thereafter opened, conduction will be maintained through MOSFET 30 by capacitor 74 through resistors 77 and 42 to the gate of MOSFET 30. The leakage of charge from capacitor 74 and the gate of MOSFET 30 will be very slow; and capacitor 74 will thus latch the motor in a running condition until the motor meets an impediment such as the window frame in a fully open stopped position. Motor current will thereafter be limited by transistor 64 in a manner similar to that of transistor 62 for upward motion of window 10 until capacitor 74 discharges through transistor 64. This second mode of operation, chosen by an actuation of switch 46 for an intermediate duration, is the one-touch automatic window actuation mode.

If switch 46 is held closed for a longer period of time, capacitor 74 will continue to charge until the switch voltage of silicon switch 76 is reached. When this voltage is reached, silicon switch 76 latches closed to become a short circuit across capacitor 74 and immediately discharge it to unlatch the latching effect of capacitor 74 upon MOSFET 30 and defeat automatic operation. The operation from this point is then identical with that already described for the up switch 40: namely, that the motor 16 will continue to run until switch 46 is opened or until the obstruction of a fully open window causes transistor 64 to limit the current flow through the armature of motor 16 and the operator then opens switch 46 by releasing the same.

The purpose of transistor 66 and its associated resistors 86 and 88 is to handle the situation in which both switches 40 and 46 are closed simultaneously. In this situation, the preferred result is downward movement of the window. Closure of switch 46, therefore, turns on transistor 66 to provide base current for the transistor 62 and thus prevent significant current flow through MOSFET 32 even if switch 40 is closed. Thus, the shorting of both MOSFETS 30 and 32 in a low resistance condition across the power supply is prevented. Resistor 90 is further provided as an alternate load for MOSFETS 30 and 32 should the circuit become disconnected from motor 16. Although the preferred embodiment shows the invention applied only to downward movement of the window, it is clear that similar circuitry could be applied to upward movement of the window either alternatively or in conjunction with that circuitry shown herein. Both the concept of such application and the specific circuit design would be obvious to those skilled in the art in view of this disclosure.

A list of component identifications and values for a preferred embodiment as shown in the FIGURE follows:

Transistors

56, 62—2N5172
64, 66, 68—2N4121

Capacitors

54, 82—0.1 μF
74—10 μF

Resistors

38, 42, 52, 57, 78, 81, 84, 86, 88—10K
77—22K
90—100 ohms.

The embodiments of the invention in which an exclusive property or privilege is claimed are defined as follows:

1. Power window control apparatus for a motor vehicle window comprising, in combination:

electric motor means effective during actuation to drive said window toward a predetermined position;

operator controlled actuation means effective only during actuation to actuate the electric motor means;

further actuation means responsive to the actuation and deactivation of the operator controlled actuation means to maintain continuing actuation of the electric motor means after said deactivation only if the duration of actuation of the operator controlled actuation means is between first and second predetermined time periods; and automatic deactivation means effective, when the window reaches the predetermined position, to deactivate the electric motor means and the further actuation means, whereby a single operator controlled actuator provides operator control for short and long window movements or automatic window movement control, based on the duration of operator actuation.

2. Power window control apparatus for a motor vehicle window comprising, in combination:

electric motor means effective during actuation to drive said window toward a predetermined position;

electric power switch means effective, when actuated, to actuate said electric motor means;

operator controlled switch means effective, only when actuated, to actuate said electric power switch means;

timed latching actuation means effective at the end of a first predetermined time period of uninterrupted actuation of the operator controlled switch means, to maintain actuation of the electric power switch means upon activation of the operator controlled switch means;

timed unlatching means effective, at the end of a second predetermined time period of uninterrupted actuation of the operator controlled switch means longer than said first predetermined time period, to deactivate said timed latching actuation means; and automatic deactivation means effective, when the window reaches the predetermined position, to deactivate the electric motor means and the timed latching actuation means, whereby a single operator controlled actuator provides operator control of short or long window movements or automatic window control based on the duration of operator actuation.

3. Power window control apparatus for a motor vehicle comprising, in combination:

electric motor means effective during actuation to drive said window toward a predetermined position;

voltage sensitive electric power switch means effective, when provided with a voltage exceeding predetermined voltage, to actuate said electric motor means;

operator controlled voltage supply means effective, only when actuated, to provide said predetermined voltage to the voltage sensitive power switch means to actuate the same;

electric charge storage means having a charge dependent voltage thereacross and being connected to provide said charge dependent voltage to said voltage sensitive electric power switch means so as to actuate said latter means when said charge dependent voltage exceeds said predetermined voltage;

electric current supply means actuated only during actuation of the operator controlled switch means to supply electric current to said electric charge storage means and thereby increase the voltage thereacross to said predetermined voltage at the end of a first predetermined time period of uninterrupted actuation of the operator controlled switch means;

voltage controlled switch means connected across said electric charge storage means to provide a fast discharge path therefore when actuated, said voltage controlled switch means being activated by a second predetermined voltage greater than said first predetermined voltage thereacross, said second predetermined voltage being reached at the end of a second predetermined time period of uninterrupted actuation of the operator controlled switch means; and automatic deactivation means effective, when the window reaches the predetermined position, to reduce the voltage provided to the electric power switch means and discharge the electric charge storage means regardless of actuation of the operator controlled switch means to deactivate said electric motor means, whereby a single operator controlled actuator provides operator control for short or long window movements or automatic window movement control based on the duration of operator actuation.

4. Power window control apparatus for a motor vehicle window comprising, in combination:

an electric power source;

electric motor means effective during actuation to drive said window toward a predetermined stopped position;

power FET means connected in series with said electric motor means and electric power source, said power FET means having a gate effective to actuate the same to actuate the electric motor means when provided with a voltage exceeding a first predetermined voltage;

operator controlled switch means connecting, when closed, said electric power source to said power FET gate so as to provide said gate with a voltage exceeding the first predetermined voltage;

a capacitor connected so as to control the voltage applied to the power FET gate when the operator controlled switch means is opened;

a resistive charging path connecting said capacitor to the electric power source through said operator controlled switch means, said path being characterized by an RC time constant effective to ensure a voltage applied to said power FET gate exceeding the first predetermined voltage at the end of a first predetermined time period of uninterrupted closure of the operator actuated switch;

a latching switch connected across the capacitor, said latching switch being triggered into latched conduction to quickly discharge said capacitor therethrough when the voltage thereacross reaches a second predetermined voltage higher than the first at the end of a second predetermined time period of uninterrupted closure of the operator actuated switch;

semiconductor switch means sensitive to the voltage across the power FET and responsive to a voltage in excess of a third predetermined voltage indicative of increased motor current flow resulting from the window reaching its predetermined stopped position or a blocking object to actuate and thereby reduce the voltage provided to the power FET gate, said shorting switch means further discharging said capacitor and overriding said operator controlled switch means to deactivate said electric motor means, whereby a single operator controlled actuator provides operator control for short or long window movements or automatic window control, based on the duration of operator actuation.

* * * * *

UNITED STATES PATENT AND TRADEMARK OFFICE
CERTIFICATE OF CORRECTION

PATENT NO. : 4,476,416

DATED : October 9, 1984

INVENTOR(S) : Joseph P. Licata, Richard N. Lehnhoff, Frank J. Terkoski

It is certified that error appears in the above—identified patent and that said Letters Patent is hereby corrected as shown below:

Column 5, claim 2, line 20, "activation" should read -- deactivation --.

Signed and Sealed this

*Twenty-third* Day of *April 1985*

[SEAL]

*Attest:*

DONALD J. QUIGG

*Attesting Officer* *Acting Commissioner of Patents and Trademarks*